United States Patent [19]

Nakai

[11] Patent Number: 4,806,586

[45] Date of Patent: Feb. 21, 1989

[54] REINFORCED MOLDING RESIN COMPOSITION

[75] Inventor: Mikio Nakai, Fuji, Japan

[73] Assignee: Polyplastics Co., Ltd., Osaka, Japan

[21] Appl. No.: 172,111

[22] Filed: Mar. 23, 1988

[30] Foreign Application Priority Data

Mar. 25, 1987 [JP]  Japan .................................. 62-71068

[51] Int. Cl.$^4$ .......................... C08K 7/14; C08K 7/08; C08K 3/34
[52] U.S. Cl. .................................. 524/413; 523/212; 523/214; 524/449
[58] Field of Search ................. 524/449, 413; 523/212

[56] References Cited

U.S. PATENT DOCUMENTS

| | | | |
|---|---|---|---|
| 4,412,103 | 10/1983 | Fujii et al. | 524/449 |
| 4,533,680 | 8/1985 | Kasuga et al. | 524/449 |
| 4,560,715 | 12/1985 | Ueeda et al. | 524/449 |

FOREIGN PATENT DOCUMENTS 1587894  4/1981  United Kingdom .

*Primary Examiner*—Lewis T. Jacobs
*Attorney, Agent, or Firm*—Nixon & Vanderhye

[57] ABSTRACT

A reinforced molding resin composition comprises
(A) a polyacetal resin or aromatic polyester resin, and in mixture therewith,
(B) one or more kinds of reinforcing materials selected from glass fibers, carbon fibers, and potassium titanates, in an amount of 2~57% by weight based on the total weight of the composition, and
(C) a mica having a means particle diameter of 0.5~20 μm and an aspect ratio of more than 10, in an amount of 3~58% by weight based on the total weight of the composition, in such a way that the total amount of the ingredients (B) and (C) is not more than 60% by weight based on the total weight of the composition.

3 Claims, No Drawings

REINFORCED MOLDING RESIN COMPOSITION

[INDUSTRIAL FIELD OF APPLICATION]

The present invention relates to a reinforced molding resin composition which has high mechanical strength, is less liable to molding deformation, has good surface characteristics and gloss, and which provides exceptional retention of weld strength.

[PRIOR ART]

Polyacetal resins and aromatic polyesters have good physical and chemical properties, and moreover they have good processability. Therefore, they are used independently for manufacture of various molded articles. In some areas of application, however, it has been a usual practice to mix various kinds of reinforcements and additives with the resins in order to modify the properties of such resin. In those areas in which high mechanical strength and rigidity are required, it is well known to use fibrous reinforcing materials, typical of which are glass fibers, in order to obtain moldings that can meet such requirements. However, incorporation of fibrous reinforcements, such as glass fibers, involves the problem of increased anisotropy which is a cause of molding deformation, i.e., "warpage". In order to prevent or minimize such possible molding deformation, there have been proposed a number of concepts including the use of granular materials, such as glass beads, or lamellar reinforcements, such as talc, mica, and glass foils. While incorporation of these additives is effective in preventing possible deformation on one hand, no much improvement can be expected in respect of strength characteristics on the other hand. Hence, attempts have been made to meet the both requirements, strength and deformation resistance, by using fibrous reinforcements and lamellar or granular materials in combination (as in Japanese Provisional Patent Publication No. 121843 of 1978 and No. 189170 of 1984). Especially, components incorporating reinforcements, such as glass fibers, and mica in combination have not only improved mechanical properties and improved molding deformation resistance, but also improved dielectric strength and other electrical properties and improved heat resistance; therefore, they are useful as materials for electrical components and machinery parts.

[PROBLEMS TO BE SOLVED BY THE INVENTION]

However, polyacetal resins or aromatic polyesters which incorporate fibrous reinforcements, such as glass fibers, and mica in combination are often unable to provide sufficient practical properties in respect of strength and surface characteristics, when they are made into molded articles. More particularly, where weld marks are present in the injection molding, the resulting decrease in strength, coupled with loss of surface smoothness and luster of the molding, will adversely affect the appearance of the molding, which in turn will pose another problem of commercial value degradation of the molding. As a matter of fact, with injection moldings in particular, such as those produced by two-point gate injection molding or those of ring shape produced by one-point gate injection molding, the presence of weld marks is often unavoidable, and reduced strength due to the presence of such welds is a serious problem indeed from the standpoint of practical application. Such difficulty may be overcome to some extent by controlling molding conditions, such as cylinder temperature, injection pressure, and mold temperature, during the process of molding. However, no fundamental solution has yet been reached.

The object of the present invention is to provide a composition which offers improvements over polyacetal or polyester compositions incorporating a combination of glass fiber or the like reinforcement and mica, in respect of weld strength and appearance of thin moldings in which they are found deficient while retaining various excellent characteristics of such compositions, including resistance to deformation, mechanical properties, heat resistance, nd electrical properties, and which, being thus well balanced in various property aspects, is of high practical value.

[MEANS FOR SOLVING THE PROBLEM]

With a view to solving the foregoing problem, the present inventors made a series of studies and as a result they reached the conclusion that in order to minimize possible loss of weld strength it should be necessary to use a mica having its particle diameter reduced as far as possible. Usually, however, if mica is made smaller in particle diameter, its aspect ratio becomes smaller. The use of such mica having a smaller aspect ratio will naturally result in the loss of the outstanding feature, i.e., low deformability, of a mica-filled resin. After further studies, the present inventors arrived at the idea of preparing a mica having a finer particle size and a relatively large aspect ratio and incorporating into a polyacetal or polyester resin such specific mica in combination with glass fibers, carbon fibers, potassium titanate fibers, or the like, whereby they succeeded in obtaining a molding composition which retains good features of conventional mica-filled resin compositions, such as deformation resistance (warpage resistance), strength and rigidity characteristics, and thermal and electrical properties, and yet offers remarkable improvements over such conventional resin compositions in respect of weld strength of their moldings in which they are fatally deficient, and which thus have well balanced properties.

Accordingly, the present invention provides a reinforced molding resin composition comprising (A) a polyacetal resin or aromatic polyester resin, and in mixture therewith, (B) one or more kinds of reinforcing materials selected from glass fibers, carbon fibers, and potassium titanates (in an amount of 2~57% by weight based on the total weight of the composition, and (C) a mica having a mean particle diameter of 0.5~20 μm and an aspect ratio of more than 10 (in an amount of 3~58% by weight based on the total weight of the composition), in such a way that the total amount of the ingredients (B) and (C) is not more than 60% by weight based on the total weight of the composition. The composition incorporates reinforcements, such as glass fibers, and a mica which meets both such particular mean particle size and such particular aspect ratio requirements as above mentioned; therefore, it has high strength and high elastic modulus, is less liable to deformation, and provides exceptionally high retention of strength at weld portions.

In the present invention, a polyacetal resin or aromatic polyester resin is used as a base resin.

The polyacetal resin may be either a homopolymer or a copolymer, or may be one having a branched or crosslinked structure given by a known procedure.

Illustrative of the aromatic polyester resin are polyalkylene terephthalates, such as polyethylene terephthalate and polybutylene terehthalate; or complete aromatic polyesters produced by reaction between aromatic dicarboxylic acids and aromatic diols or aromatic oxycarboxylic acids; or aromatic polyester elastomers having a polymeric soft segment, such as polyoxyalkylene glycol, as an ingredient.

According to the invention, in order to provide improved mechanical strength in particular, there is added to such polyacetal resin or aromatic polyester resin one or more kinds of ingredients (B) selected from glass fibers, carbon fibers, and potassium titanates, as reinforcements, in an amount of 2~57% by weight, preferably 5~45% by weight based on the total weight of the composition. If the amount of filling is less than 2% by weight, no sufficient reinforcement can be obtained. If the amount is excessively large, it has undesirable effects on the molding properties of the composition and also on the surface characteristics of moldings.

For the glass fibers herein, those of fibrous configuration having a mean fiber diameter of 2~30 μm, preferably 5~15 μm, such as chopped strands, milled fibers, and rovings, are all useful. Considering a good balance of their reinforcement and anti-deformation effects, it is preferred that the glass fibers should be dispersed in the composition and, more particularly, in moldings thereof, in such a way that they have a mean fiber length (weight average) of 50~1000 μm, more particularly 100~500 μm.

For the carbon fibers, acrylic-, pitch-, cellulose-, and rayon-based carbon fibers, or graphitized fibers thereof may be used in various forms including but not limited to chopped fiber, tow, and yarn. Generally, chopped fibers having a mean fiber diameter of 2~30 μm and a mean fiber length of 0.2~20 mm are preferred.

With such carbon fibers as well, it is preferred that they have a mean fiber length (weight average) of 50~1000 μm, more preferably 100~500 μm, in the composition and, more particularly, in moldings thereof.

For the potassium titanate fibers, those having a mean fiber diameter of 0.05 μm and a mean fiber length of 2~100 μm are preferred.

The mica used as ingredient (C) in the present invention has a mean particle diameter of 0.5~20 μm, preferably 0.5~10 μm, and a mean aspect ratio of more than 10, preferably 10~60. More particularly, a mica having a mean particle diameter of 2~10 μm and a mean aspect ratio of 10~40 can be advantageously used in that it provides good properties and high weld strength.

The amount of such mica loading in the present invention is 3~58% by weight, preferably 5~45% by weight, based on the total weight of the composition. If the amount is less than 3% by weight, no desired property can be obtained, and more specifically no satisfactory resistance to deformation can be obtained. If the amount is excessively large, the result is poor molding.

If the total of the glass fibers or the like reinforcement (B) and the mica (C) is more than 60% by weight, it has very unfavorable effects on the moldability of the composition, and further it often deteriorates the mechanical and physical properties of the resin.

According to the invention, the total of loadings, reinforcement (B) and mica (C), should be 5~60% by weight, more preferably 10~50% by weight.

Considering a good balance of reinforcement and antideformation effects of and property advantages, such as weld strength, obtainable from such loadings, the weight ratio [(C)/(B)] between reinforcement (B) and mica (C) should be preferably 1/2~10/1, more preferably 1/1~5/1.

Referring to the particle size distribution of the mica used in the practice of the invention, there are trace amounts of particles having diameters of more than 40 μm and more than 50% by weight of those having diameters of less than 20 μm; preferably, there are more than 50% by weight of particles having diameters of less than 10 μm and more than 80% by weight of those having diameters of more than 0.5 μm. A particularly preferred particle size distribution is such that there are more than 70% by weight of particles having diameters of less than 10 μm and more than 90% by weight of those having diameters of more than 0.5 μm.

The "mean particle diameter" and "aspect ratio" herein are defined and measured as follows:

<Method for mean particle diameter measurement>

Mean particle size distribution measurements were made by employing a Shimazu centrifugal settling-type particle size distribution measuring instrument (model SA-CP2) and according to the centrifugal sedimentation method (rotation speed 600 rpm).

<Method for mean aspect ratio calculation>

Mean aspect ratio was calculated by the following equation:

$$R = 1/d$$

where
R: aspect ratio
l: mean particle diameter
d: mean thickness

The mean thickness d in the equation was calculated according to the following equation after a closest packed monoparticle film area S of the mica on water surface was measured in accordance with the surface monoparticle film method [Nishino, M., and Arakawa, M., "Zairyo" (Materials), vol 27, p 696 (1978)].

$$d = W/[p(1-\epsilon)S$$

where
W: mica weight
p: specific gravity of mica (2.86)
$\epsilon$: voidage (0.1) when the mica assumed closest packed condition on water surface
( ): value calculated Such mica having a fine particle size and a relatively high aspect ratio as used in the present invention could hardly be manufactured on an industrial scale before. If a mica was reduced to fine particles having a mean diameter of 0.5~20.0 μm or, more particularly, of 0.5~10.0 μm, it would take a powder form of a low aspect ratio, it being extremely difficult to maintain it at a high aspect ratio value of more than 10. Prior to the present invention, therefore, it has never been known that a resin composition incorporating a specific mica of such size and configuration as the mica used in the invention is effective in achieving such improvements as provided by the present invention, and more particularly for weld strength improvement. Recently, however, it has become possible to prepare, and economically obtain, micas of such size and configuration; and in the course of their studies the present inventors found that only when such mica was used for loading, some unexpectedly good improvement could be obtained in weld strength which had never been seen with conventional micas. Thus, by incorporating such mica in combination with reinforcements, such as glass fibers, they succeeeded in obtaining a composition which, through synergistic effects of such ingredients, exhibits good economic feasibility and high practical utility for production of moldings.

According to the findings of the present inventors, where a conventional mica having a mean particle size of more than 20 μm is used, good results can be seen as far as deformation (warpage) of moldings is concerned, but the difficulty is that in moldings in which welds are present, the strength of the welds is considerably low.

It is still difficult today to prepare a mica having a mean particle diameter of less than 0.5 μm and a high aspect ratio, e.g., an aspect ratio of more than 10. Such mica is obtainable only in poor yields and even undesirable economically. A mica having a mean particle diameter of less than 0.5 μm and an aspect ratio of less than 10 may provide good weld strength, but it cannot have any good effect against deformation (warpage). Therefore, although the mean particle diameter range of 0.5~20 μm is essential, it is understood that if the mean particle diameter is within this range but if the aspect ratio is less than 10, no favorable effect is obtainable in respect of deformation (warpage), though good weld strength may be provided. Therefore, in order to provide for general and uniform improvement in various properties and, more particularly, in dimensional strength (warpage resistance) and weld strength, it is necessary to use a mica which meets the above mentioned requirements of the invention, considering its availability and economy. Only by using such mica is it possible to produce a composition having such well balanced properties as according to the invention. This constitutes the essential feature of the invention which cannot be attained by any conventional mica and fibrous material loaded resin composition.

The reinforcements (B), such as glass fibers and the like, and/or mica (C) according to the invention can of course be used as they are, but they may be previously surface treated with known surface treating and coupling agents, e.g., functional compounds, such as epoxy, silane, isocyanate, and titanate compounds, and more particularly, multi-functional compounds; or they may be added simultaneously and melt-kneaded, whereby their effects may be further enhanced. Such procedure may be advantageously used, because it is effective in providing improved weld strength. Especially, use of a surface treated mica is preferred, because it provides remarkable effects for weld strength improvement.

Known additives, such as stabilizers, antistatic agents, parting agents, flame retardants, nucleating agents, and colorants, may be incorporated into the composition of the invention insofar as they are not detrimental to the object of the invention.

Conventional inorganic fillers, fibrous, granular, and spherical, other than the essential ingredients, fillers (B), such as glass fibers and the like, and mica (C), may also be used in combination with said ingredients. These inorganic fillers may be surface treated with a surface treating agent, a coupling agent, or a sizing agent, or may be added together with such agent.

The composition of the invention, according to the purposes for which it is used, may incorporate known thermoplastic resins, such as, for example: polyethylene, polypropylene, ethylene-propylene copolymer, ethylene-vinyl acetate copolymer, ethylene-acrylate copolymer, polyamide, polystyrene, styrene-butadiene copolymer, styrene-butadiene-acrylonitrile copolymer, styrene-butadiene-acrylic acid (or ester thereof) copolymer, styrene-acrylonitrile copolymer, polycarbonate, polyurethane, fluoroplastics, polyphenylene oxide, polyphenylene sulfide, polybutadiene, polyolefin halide, vinyl polyhalide, butyl rubber, silicone rubber, and multi-layer graft copolymers principally of polyacrylate, or their modifications.

The compositions of the invention can be readily prepared by various known methods conventionally employed in preparing reinforced resins and/or filler-loaded resins. For example, one method is such that essential ingredients of the invention, and if necessary, auxiliary ingredients, are mixed together, then the mixture is melt-kneaded and pelletized by employing an extruder, and thereafter molding operation is carried out. Another method is such that pellets of different compositions prepared in advance are mixed together before molding operation, and the composition of the invention is obtained after molding operation. Another method is such that one or more kinds of the ingredients are charged directly into a molding machine

[EXAMPLES]

The following examples are given to further illustrate the present invention. It is understood, however, that the invention is in no way limited by the examples

EXAMPLES 1~9

A polbbutylene terephthalate resin ("Juranex", made by Polyplastics Co.) was mixed with 10% by weight of glass fibers (amino-silane surface treated) having a mean fiber diameter of 9μ and a mean fiber length of 6 mm, and 30% by weight of micas of varied configurations (hereinafter referred to as A~F) in a ribbon blender. By employing a 40 mmφ extruder the mixture was kneaded and extruded into pellets. In Examples 7~9, amino-silane surface treated micas were used. Test specimens conforming to ASTM standard were molded from the pellets in the following two ways:

(A) molding by a oold having one gate (with no weld)
(B) molding by a mold having two gates, one each at two ends (with a weld at center)

Specimens (A) were tested for tensile and flexural characteristics according to ASTM standards, and specimens (B) were tested for tensile characteristics. Further, a square plate measuring 120 mm one side and 2 mm in thickness was molded of each composition. This specimen was placed on a flat surface and measurement was made of a distance from the flat surface to a highest point on the square plate. A maximum value was taken as warpage. Weld strength is given in terms of retention % for specimen (B) with a weld as measured against specimen (A) with no weld, tensile strength of the specimen (A) being taken as 100. The results are shown in Table 1.

Mean fiber length (weight average) values were measured with glass fibers in test specimens (A) for Examples 1~9 and Comparative Examples 1~6. In all cases, mean fiber length values were within the range of 240~280 μm.

COMPARATIVE EXAMPLES 1~6

With samples incorporating micas (G~K) of various sizes and configurations which do not meet the requirements of the invention in combination with glass fibers, and also with those incorporating glass fibers only, evaluation was made in same manner as in Examples 1~9. The results are shown in Table 1.

Details of micas A~K used are as given hereinafter, of which micas A~F are within the limits defined by the invention, micas G~K being outside the limits.

EXAMPLES 10~15

Using micas A and C as defined hereinafter, evaluation was made in same manner as in Examples 1 and 3, except that mica and glass fiber loadings were varied as shown in Table 2. The results are shown in Table 2.

COMPARATIVE EXAMPLES 7~12

Using micas G and J, hereinafter described, of configurations which do not meet the requirements of the invention, evaluation was made by varying mica and glass fiber loadings in same manner as in Examples 10~15.

The results are shown in Table 2.

Mean fiber length values were measured also with glass fibers in test specimens (A) for Examples 10~15 and Comparative Examples 7~12. In all cases, mean fiber length values were within the range of 240~300 μm.

TABLE 1

| Comp./prop. | Example 1 | Example 2 | Example 3 | Example 4 | Example 5 | Example 6 | Example 7 |
|---|---|---|---|---|---|---|---|
| Composition (wt %) | | | | | | | |
| Polybutylene terephthalate | 60.0 | 60.0 | 60.0 | 60.0 | 60.0 | 60.0 | 60.0 |
| Mica | | | | | | | |
| A | 30.0 | — | — | — | — | — | 30.0* |
| B | — | 30.0 | — | — | — | — | — |
| C | — | — | 30.0 | — | — | — | — |
| D | — | — | — | 30.0 | — | — | — |
| E | — | — | — | — | 30.0 | — | — |
| F | — | — | — | — | — | 30.0 | — |
| G | — | — | — | — | — | — | — |
| H | — | — | — | — | — | — | — |
| I | — | — | — | — | — | — | — |
| J | — | — | — | — | — | — | — |
| K | — | — | — | — | — | — | — |
| Glass fiber | 10.0 | 10.0 | 10.0 | 10.0 | 10.0 | 10.0 | 10.0 |
| Meas. item | | | | | | | |
| Tensile | | | | | | | |
| strength (kg/cm$^2$) | 841 | 872 | 918 | 850 | 912 | 915 | 908 |
| elongation (%) | 1.5 | 1.7 | 1.7 | 1.8 | 1.7 | 1.6 | 1.6 |
| Flexural properties | | | | | | | |
| stress at rupture (kg/cm$^2$) | 1365 | 1394 | 1458 | 1376 | 1418 | 1436 | 1462 |
| initial modulus (kg/cm$^2$) | $7.7 \times 10^4$ | $8.0 \times 10^4$ | $8.6 \times 10^4$ | $8.0 \times 10^4$ | $8.5 \times 10^4$ | $8.5 \times 10^4$ | $7.9 \times 10^4$ |
| Tensile strength retention at weld (%) | 68 | 64 | 62 | 67 | 65 | 65 | 82 |
| Warpage (mm) | 0.42 | 0.34 | 0.25 | 0.37 | 0.30 | 0.27 | 0.40 |

| Comp./prop. | Example 8 | Example 9 | Comp. Expl. 1 | Comp. Expl. 2 | Comp. Expl. 3 | Comp. Expl. 4 | Comp. Expl. 5 | Comp. Expl. 6 |
|---|---|---|---|---|---|---|---|---|
| Composition (wt %) | | | | | | | | |
| Polybutylene terephthalate | 60.0 | 60.0 | 60.0 | 60.0 | 60.0 | 60.0 | 60.0 | 60.0 |
| Mica | | | | | | | | |
| A | — | — | — | — | — | — | — | — |
| B | 30.0* | — | — | — | — | — | — | — |
| C | — | 30.0* | — | — | — | — | — | — |
| D | — | — | — | — | — | — | — | — |
| E | — | — | — | — | — | — | — | — |
| F | — | — | — | — | — | — | — | — |
| G | — | — | 30.0 | — | — | — | — | — |
| H | — | — | — | 30.0 | — | — | — | — |
| I | — | — | — | — | 30.0 | — | — | — |
| J | — | — | — | — | — | 30.0 | — | — |
| K | — | — | — | — | — | — | 30.0 | — |
| Glass fiber | 10.0 | 10.0 | 10.0 | 10.0 | 10.0 | 10.0 | 10.0 | 40.0 |
| Meas. item | | | | | | | | |
| Tensile | | | | | | | | |
| strength (kg/cm$^2$) | 943 | 969 | 947 | 938 | 922 | 804 | 812 | 1450 |
| elongation (%) | 1.7 | 1.7 | 1.4 | 1.5 | 1.7 | 1.8 | 1.8 | 2.2 |

TABLE 1-continued

| Flexural properties | | | | | | | | |
|---|---|---|---|---|---|---|---|---|
| stress at rupture (kg/cm$^2$) | 1501 | 1572 | 1472 | 1449 | 1445 | 1321 | 1336 | 2260 |
| initial modulus (kg/cm$^2$) | 8.4 × 10$^4$ | 8.7 × 10$^4$ | 8.6 × 10$^4$ | 8.4 × 10$^4$ | 8.1 × 10$^4$ | 7.5 × 10$^4$ | 7.5 × 10$^4$ | 9.9 × 10$^4$ |
| Tensile strength retention at weld (%) | 80 | 76 | 21 | 21 | 28 | 57 | 55 | 57 |
| Warpage (mm) | 0.31 | 0.25 | 0.22 | 0.21 | 0.25 | 1.1 | 1.0 | 5.7 |

*Amino-silane treated mica used

TABLE 2

| Comp./pro. | Example 10 | Example 11 | Comp. Expl. 7 | Comp. Expl. 8 | Example 12 | Example 13 | Comp. Expl. 9 | Comp. Expl. 10 | Example 14 | Example 15 | Comp. Expl. 11 | Comp. Expl. 12 |
|---|---|---|---|---|---|---|---|---|---|---|---|---|
| Composition (wt %) | | | | | | | | | | | | |
| Polybutylene terephthalate | 80.0 | 80.0 | 80.0 | 80.0 | 70.0 | 70.0 | 70.0 | 70.0 | 60.0 | 60.0 | 60.0 | 60.0 |
| Mica | | | | | | | | | | | | |
| A | 10.0 | — | — | — | 20.0 | — | — | — | 10.0 | — | — | — |
| C | — | 10.0 | — | — | — | 20.0 | — | — | — | 10.0 | — | — |
| G | — | — | 10.0 | — | — | — | 20.0 | — | — | — | 10.0 | — |
| J | — | — | — | 10.0 | — | — | — | 20.0 | — | — | — | 10.0 |
| Glass fiber | 10.0 | 10.0 | 10.0 | 10.0 | 10.0 | 10.0 | 10.0 | 10.0 | 30.0 | 30.0 | 30.0 | 30.0 |
| Meas. item | | | | | | | | | | | | |
| Tensile | | | | | | | | | | | | |
| strength (kg/cm$^2$) | 838 | 865 | 883 | 816 | 847 | 884 | 919 | 807 | 1355 | 1372 | 1385 | 1348 |
| elongation (%) | 2.7 | 2.8 | 2.7 | 2.6 | 2.2 | 2.4 | 2.2 | 2.3 | 1.9 | 2.1 | 2.0 | 2.0 |
| Flexural properties | | | | | | | | | | | | |
| stress at rupture (kg/cm$^2$) | 1387 | 1395 | 1411 | 1328 | 1369 | 1429 | 1447 | 1346 | 2059 | 2064 | 2082 | 2048 |
| initial modulus (kg/cm$^2$) | 5.6 × 10$^4$ | 5.8 × 10$^4$ | 5.8 × 10$^4$ | 5.5 × 10$^4$ | 6.7 × 10$^4$ | 7.2 × 10$^4$ | 7.3 × 10$^4$ | 6.7 × 10$^4$ | 9.4 × 10$^4$ | 9.5 × 10$^4$ | 9.5 × 10$^4$ | 9.3 × 10$^4$ |
| Tensile strength retention at weld (%) | 83 | 80 | 42 | 64 | 76 | 74 | 30 | 61 | 57 | 56 | 37 | 49 |
| Warpage (mm) | 2.0 | 1.8 | 1.7 | 3.2 | 1.0 | 0.87 | 0.82 | 2.3 | 3.9 | 3.8 | 3.8 | 4.9 |

EXAMPLES 16~18

A polybutylene terephthalate resin ("Juranex", made by Polyplastics Co.) was mixed with carbon fibers having a mean fiber diameter of 12.5 μm and a mean fiber length of 6 mm, or a potassium titanate having a mean fiber diameter of 1 μm and a mean fiber length of 50 μm, and micas A and C, hereinafter defined. Evaluation was made in same manner as in Examples 1 and 3. The results are shown in Table 3.

COMPARATIVE EXAMPLES 13~16

With samples incorporating micas (G and J hereinafter described) of configurations which do not meet the requirements of the invention, and carbon fibers or potassium titanate, evaluation was made in same manner as in Examples 16~18. The results are shown in Table 3.

Mean fiber length values were measured with carbon fibers in test specimens (A) for Examples 16 and Comparatve Example 13. They were 235 μm and 218 μm respectively.

EXAMPLES 19~22

A polyacetal resin ("Juracon-M-90", produced by Polyplastics Co.) was mixed with glass fibers (amino-silane treated) having a mean fiber diameter of 9 μm and a mean fiber length of 6 mm, or milled glass fibers (amino-silane treated) having a mean fiber diameter of 9 μm and a mean fiber length of 70 μm, and micas of varied configurations (A and B hereinafter defined), in such proportions as shown in Table 4 in a ribbon blender. By employing a 40 mmφ extruder the mixture was kneaded and extruded into pellets. These pellets were molded into moldings, and evaluation was made of the moldings, in same manner as in Examples 1~9. The results are shown in Table 4.

COMPARATIVE EXAMPLES 17~21

With samples incorporating micas (G and K hereinafter described) of various sizes and configurations which do not meet the requirements of the invention, in combination with glass fibers or milled glass fibers, and one incorporating glass fibers only, pellets were prepared and molded into moldings, and evaluation was made of the moldings, in same manner as in Examples 19~22. The results are shown in Table 4.

TABLE 3

| Comp./prop. | Example 16 | Comp. Expl. 14 | Example 17 | Example 18 | Comp. Expl. 15 | Comp. Expl. 16 | Comp. Expl. 17 |
|---|---|---|---|---|---|---|---|
| Composition (wt %) | | | | | | | |
| Polybutylene terephthalate | 60.0 | 60.0 | 70.0 | 70.0 | 70.0 | 70.0 | 70.0 |
| Mica | | | | | | | |

TABLE 3-continued

| Comp./prop. | Example 16 | Comp. Expl. 14 | Example 17 | Example 18 | Comp. Expl. 15 | Comp. Expl. 16 | Comp. Expl. 17 |
|---|---|---|---|---|---|---|---|
| A | 30.0 | — | 20.0 | — | — | — | — |
| C | — | — | — | 20.0 | — | — | — |
| G | — | 30.0 | — | — | 20.0 | — | — |
| J | — | — | — | — | — | 20.0 | — |
| Carbon fiber | 10.0 | 10.0 | — | — | — | — | — |
| Potassium titanate | — | — | 10.0 | 10.0 | 10.0 | 10.0 | 30.0 |
| Meas. item | | | | | | | |
| Tensile | | | | | | | |
| strength (kg/cm$^2$) | 814 | 837 | 724 | 737 | 749 | 722 | 1137 |
| elongation (%) | 1.7 | 1.8 | 2.3 | 2.3 | 2.4 | 2.2 | 2.8 |
| Flexural properties | | | | | | | |
| stress at rupture (kg/cm$^2$) | 1345 | 1373 | 1276 | 1293 | 1302 | 1261 | 1886 |
| initial modulus (kg/cm$^2$) | $7.3 \times 10^4$ | $8.2 \times 10^4$ | $6.9 \times 10^4$ | $7.3 \times 10^4$ | $7.3 \times 10^4$ | $6.8 \times 10^4$ | $9.8 \times 10^4$ |
| Tensile strength retention at weld (%) | 69 | 23 | 78 | 75 | 33 | 65 | 58 |
| Warpage (mm) | 0.38 | 0.22 | 0.83 | 0.74 | 0.71 | 1.8 | 4.3 |

TABLE 4

| Comp./prop. | Example 19 | Example 20 | Comp. Expl. 17 | Comp. Expl. 18 | Comp. Expl. 19 | Example 21 | Comp. Expl. 20 | Example 22 | Comp. Expl. 21 |
|---|---|---|---|---|---|---|---|---|---|
| Composition (wt %) | | | | | | | | | |
| Polyacetal resin | 80.0 | 80.0 | 80.0 | 80.0 | 80.0 | 80.0 | 80.0 | 80.0 | 80.0 |
| Mica | | | | | | | | | |
| A | 10.0 | — | — | — | — | 10.0 | — | 10.0 | — |
| B | — | 10.0 | — | — | — | — | — | — | — |
| G | — | — | 10.0 | — | — | — | 10.0 | — | 10.0 |
| K | — | — | — | 10.0 | — | — | — | — | — |
| Glass fiber | 10.0 | 10.0 | 10.0 | 10.0 | 20.0 | — | — | 5.0 | 5.0 |
| Milled glass fiber | — | — | — | — | — | 10.0 | 10.0 | 5.0 | 5.0 |
| Meas. item | | | | | | | | | |
| Tensile | | | | | | | | | |
| strength (kg/cm$^2$) | 844 | 872 | 885 | 827 | 1025 | 625 | 642 | 748 | 761 |
| elongation (%) | 2.8 | 2.7 | 2.5 | 2.9 | 2.7 | 6.4 | 6.6 | 3.1 | 3.1 |
| Flexural properties | | | | | | | | | |
| stress at rupture (kg/cm$^2$) | 1176 | 1224 | 1247 | 1152 | 1310 | 1106 | 1132 | 1152 | 1184 |
| initial modulus (kg/cm$^2$) | $5.9 \times 10^4$ | $5.9 \times 10^4$ | $6.0 \times 10^4$ | $5.7 \times 10^4$ | $6.3 \times 10^4$ | $4.1 \times 10^4$ | $4.2 \times 10^4$ | $4.9 \times 10^4$ | $5.1 \times 10^4$ |
| Tensile strength retention at weld (%) | 69 | 64 | 22 | 55 | 60 | 68 | 24 | 70 | 22 |
| Warpage (mm) | 1.0 | 1.0 | 0.75 | 1.9 | 4.2 | 0.42 | 0.39 | 0.67 | 0.59 |
| Mean glass-fiber length in test specimen (μm) | 265 | 278 | 258 | 261 | 266 | 68 | 67 | 162 | 174 |

Respective characteristics of the various micas used in the above given examples are shown below.

| Configuration of Mica A (phlogopite) | |
|---|---|
| weight-average particle diameter | 2.5 μm |
| mean aspect ratio | 14.0 |
| Configuration of Mica B (phlogopite) | |
| weight-average particle diameter | 6.0 μm |
| mean aspect ratio | 17.0 |
| Configuration of Mica C (phlogopite) | |
| weight-average particle diameter | 8.0 μm |
| mean aspect ratio | 40.0 |
| Configuration of Mica D (muscovite) | |
| weight-average particle diameter | 3.0 μm |
| mean aspect ratio | 13.0 |
| Configuration of Mica E (phlogopite) | |
| weight-average particle diameter | 6.0 μm |
| mean aspect ratio | 30 |
| Configuration of Mica F (muscovite) | |
| weight-average particle diameter | 7.0 μm |
| mean aspect ratio | 35 |
| Configuration of Mica G (phlogopite) | |
| weight-average particle diameter | 100 μm |
| mean aspect ratio | 40.0 |
| Configuration of Mica H (muscovite) | |
| weight-average particle diameter | 90 μm |
| mean aspect ratio | 50.0 |
| Configuration of Mica I (phlogopite) | |
| weight-average particle diameter | 40 μm |
| mean aspect ratio | 30.0 |
| Configuration of Mica J (phlogopite) | |
| weight-average particle diameter | 6.0 μm |
| mean aspect ratio | 8.0 |
| Configuration of Mica K (muscovite) | |
| weight-average particle diameter | 7.0 μm |
| mean aspect ratio | 8.0 |

[Advantages of the Invention]

As is clear from the foregoing description and examples, the resin composition according to the invention overcomes the difficulty of strength decrease at weld which has been a problem with conventional reinforcement- (such as glass fibers) and mica-filled resin compositions, while keeping possible deformation, or "warpage" of molding within very small limits, without any loss of its mechanical strength characteristics. As such, it is of very high utility. Such thermoplastic resin composition is used in various areas of application, such as constructional, structural, and trim parts for electrical equipment, automobile, and general machinery. More specifically, such composition is useful for structural parts, such as chassis, for clocks, audio- or video-tape recorder, and stereophonograph; and for mechanism parts, such as gears, cams, levers, guide stays, clutches, rollers, balls, and pins. It is also advantageously used in a wide range of application areas including meter parts, exhaust valves, louvers, and lamp housing for automobiles; telephone exchange parts; electrical, electronic, and external trim parts, such as switches and relays; and also parts for textile machinery, cameras, radio sets, various types of office automation equipment, such as facsimile, copying machine, and computer; IC case, condenser, and motor parts. Further, the composition of the invention is useful as plating painting composition.

What is claimed is:

1. A reinforced molding resin composition comprising:
   (A) a polyacetal resin or aromatic polyester resin, and in mixture therewith,
   (B) one or more kinds of reinforcing materials selected from glass fibers, carbon fibers, and potassium titanates, in an amount of 2~57% by weight based on the total weight of the composition, and
   (C) a mica having a mean particle diameter of 0.5~20 μm and an aspect ratio of more than 10, in an amount of 3~58% by weight based on the total weight of the composition,
in such a way that the total amount of the ingredients (B) and (C) is not more than 60% by weight based on the total weight of the composition.

2. A reinforced molding resin composition as set forth in claim 1, wherein the mica (C) has a mean particle diameter of 0.5~10 μm and an aspect ratio of 10~60.

3. A reinforced molding resin composition as set forth in claim 1 or 2, wherein the reinforcing material (B) and/or the mica (B) is surface-treated with a surface treating agent.

* * * * *

UNITED STATES PATENT AND TRADEMARK OFFICE
CERTIFICATE OF CORRECTION

PATENT NO. : 4,806,586

DATED : February 21, 1989

INVENTOR(S) : Mikio Nakai

It is certified that error appears in the above-identified patent and that said Letters Patent is hereby corrected as shown below:

Title page, second column under "Abstract", change (C) a mica having a means" to --(C) a mica having a mean--;

Column 1, line 35, after "meet" delete "the";

Column 2, line 13, after "resistance," delete "nd"; and insert --and--.

Column 3, line 53, after "58%" delete the period (.);
line 53, delete the hyphen (-) after "by";

Column 6, line 34 change "polbbutylene" to --polybutylene--;
line 46, after "a" change "oold" to --mold--;

Column 12, line 66, after "ment", delete the hyphen (-);
line 64, after "at" insert --a--;

Column 13, line 8, after "as" insert --a--.

Signed and Sealed this

Nineteenth Day of December, 1989

*Attest:*

JEFFREY M. SAMUELS

*Attesting Officer*     *Acting Commissioner of Patents and Trademarks*